United States Patent [19]
Gitman

[11] Patent Number: 5,005,493
[45] Date of Patent: Apr. 9, 1991

[54] HAZARDOUS WASTE MULTI-SECTIONAL ROTARY KILN INCINERATOR

[75] Inventor: Gregory M. Gitman, Duluth, Ga.

[73] Assignee: American Combustion, Inc., Norcross, Ga.

[21] Appl. No.: 434,018

[22] Filed: Nov. 8, 1989

[51] Int. Cl.$^5$ .................. A47J 36/00; A47J 36/24
[52] U.S. Cl. .................... 110/246; 110/210; 110/226; 110/346
[58] Field of Search ............ 110/210, 246, 226, 342, 110/344; 432/118

[56] References Cited

U.S. PATENT DOCUMENTS

| | | | |
|---|---|---|---|
| 2,137,930 | 11/1938 | Turk | 432/118 X |
| 4,063,903 | 12/1977 | Beningson et al. | 110/226 X |
| 4,546,711 | 10/1985 | Kerwin | 110/342 X |
| 4,794,871 | 1/1989 | Schmidt et al. | 110/210 X |

FOREIGN PATENT DOCUMENTS 1551838  1/1967  Fed. Rep. of Germany ...... 110/246

Primary Examiner—Edward G. Favors
Attorney, Agent, or Firm—Needle & Rosenberg

[57] ABSTRACT

A method and device for incinerating hazardous waste, having a first rotating section for transporting hazardous waste within the device, the first rotating section having a forward opening at a first end thereof for introducing hazardous waste into the device and an exit opening at a second end thereof, a second rotating section for further transporting hazardous waste within the device, the second rotating section having a forward opening at a first end thereof and an exit opening at a second end thereof, wherein the exit opening of the first rotating section is in flow communication with the forward opening of the second rotating section, first burning means for heating and at least partially volatizing hazardous waste in the first rotating section, second burning means for increasing the temperature of solid residue in at least one additional rotating section to further convert the hazardous waste into decontaminated solid ash and flue gas, means for collecting the decontaminated residue, solid ash from the device and means for removing and decontaminating flue gases from the device prior to discharge in the environment.

66 Claims, 6 Drawing Sheets

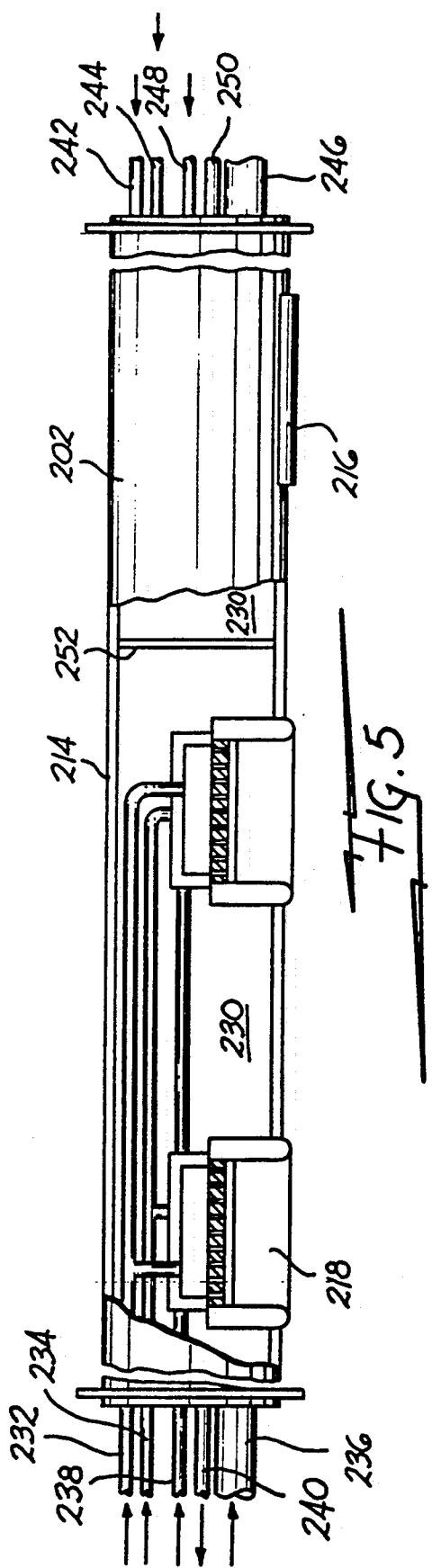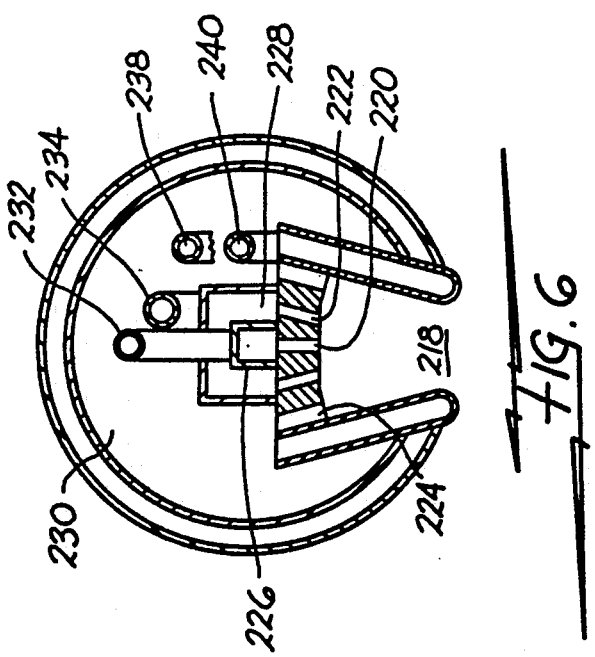

HAZARDOUS WASTE MULTI-SECTIONAL ROTARY KILN INCINERATOR

BACKGROUND OF THE INVENTION

The present invention relates to a hazardous waste incinerator, and more particularly to a multi-sectional rotary kiln incinerator used to treat variable waste streams having different caloric value, water content and slagability.

The use of rotary kilns for the incineration of hazardous waste is known. U.S. Pat. No. 4,734,166 to Angelo II discloses a rotatable cylindrical kiln. Rotary kilns are widely used due to their versatility to transport a wide variety of solid waste throughout the kiln chamber, making kilns suitable for treating the majority of solid waste streams with minimum preparation and shredding.

Many high BTU solid waste streams are decontaminated in conventional rotary kilns by burning with an additional oxidizing gas, such as air being delivered to the surface of a rotating bed. For such high BTU waste streams, the major part of heat needed to vaporize and thermally destroy hazardous components is generated by oxidation of the combustible components of the waste stream so that the release of the major portion of the heat is controlled by the distribution of the additional oxidizing gas along the kiln length. If the solid waste includes an appreciable amount of water, an initial drying is conducted by the use of drying heat being transferred to the bed from auxiliary burner(s). Auxiliary burners are also fired in the kiln to initially ignite the bed and to insure the continuous presence of a flame in the kiln to prevent the danger of flame loss and possible explosion.

The demand on the auxiliary burner for heat input significantly increases when high BTU waste has a high moisture content. Under such conditions, the role of auxiliary burners as a heating source becomes important to accomplish the rapid and effective drying of the waste layer prior to ignition. After drying and the ignition of high BTU waste, the heat being released by the waste burning is essential to support the burning and, therefore, to make the incineration process autogenous.

To provide for active waste burning, an adequate level of available oxygen and the rate of oxygen mass exchange should be maintained between a hot, dried waste residue layer and the kiln atmosphere. An additional oxidizing gas such as air, oxygen-enriched air, or pure oxygen has to be directed into the kiln interior to provide the necessary concentration of oxygen in the furnace atmosphere. Typically, the additional oxidizing gas is injected at the waste charging end of the kiln. Such injection, however, provides a negative impact on waste drying due to the substantial absorption of the heat being released by the auxiliary burner(s) by this additional oxidizing gas.

Therefore, the incineration process creates a significant variance in heat release and oxygen consumption along the rotary kiln length. Unfortunately, the conventional way of introducing both the auxiliary heat and the additional oxidizing gas responsible for heat release by the waste is limited to the rotary kiln ends. Such limitation reduces the controllability of heat input and oxygen mass transfer, which reduces the potential performance of rotary kiln incinerators.

When low BTU solid wastes, such as contaminated soil, are treated in a rotary kiln, a major part of the heat needed to vaporize and thermally destroy the hazardous constituents of the waste should be supplied by an auxiliary heat source. Therefore, high heat flux from one or more auxiliary burners must be maintained inside the rotary kiln to provide high levels of throughput, which are needed to make the incineration method of soil decontamination economically attractive.

To intensify heat transfer from the auxiliary flame envelope to the load located in the rotary kiln, the mixing process between fuel and oxidizing gas should be promoted by the burner designed to achieve a concentrated heat release inside of the flame envelope so as to maximize the time of contact between hot combustion products and the solid residue in the kiln. At the same time, due to the uneven heat flux from the flame envelope to the solid residue, an optimized distribution of heat flux is needed to maximize furnace throughput.

The ability of a solid layer of low BTU soil to conduct heat delivered to its surface by auxiliary burner(s) varies along the length of the kiln. The solid layer at the charging end of the rotary kiln may absorb a higher level of heat flux during the initial part of the heating cycle due to the presence of moisture and the higher temperature differential between the solid waste and the combustion products of the auxiliary burner, which is typically installed at the waste charging end. The ability of the solid layer to absorb heat is reduced as this soil increases in temperature travelling along the kiln. The kiln rotation speed is typically maintained at a relatively low level to minimize carry-over of solid waste particles. Due to the increasing the temperature of the soil bed surface been exposed to kiln atmosphere as it travels through the kiln, the heat flux from auxiliary burner(s) should be substantially reduced to prevent local overheating which causes slag formation and undesirable solid residue agglomeration. Because of this, the process of incineration of contaminated soil in a conventional rotary kiln involves a higher level of heat flux is typically delivered by the flame envelope(s) of auxiliary burners at the waste charging end and a substantially lower heat flux delivered by the flue gases of this burner(s) along the rest of the kiln length.

This especially impacts kilns used to decontaminate a material with low thermal conductivity such as soil. In such cases, the fear of local overheating forces the rotary kiln designers and operators to keep a reduced heat flux from the burners. This results in the loss of potential throughput capacity.

The flexibility of controlling the heat flux from combustion products of the auxiliary flame in rotary kilns is limited due to the restrictions on the placement of auxiliary burners. The location of an auxiliary burner is possible only at either end of the rotating chamber due to rotation of the kiln sidewall. Such burner locations make it difficult to optimize heat flux along the entire kiln length from the hot combustion products of auxiliary burner(s) to the solid bed having low thermal conductivity.

The process of incineration of high BTU wastes provides for the major heat release by complete or partial oxidation of the combustible components of a waste stream by using additional oxidizing gas. This oxidation process should also be controllable in order to maintain the desired heat input and temperature distribution along the entire kiln length. This should be accomplished by improved control over distribution of additional oxidizing gas inside of the kiln and preferably along the entire kiln length.

The introduction of additional oxidizing gas is also limited due to the rotation of the kiln sidewalls which restricts the placement of injectors for said oxidizing gas introduction. The introduction, at the waste charging end, of the entire volume of additional oxidizing gas needed for burning the solid residue along the entire length of the kiln provides as increase of actual gaseous volume and high superficial gas velocities. This results in an increase of waste particle carry-over from the rotary kiln.

SUMMARY OF THE INVENTION

The present invention relates to a hazardous waste incinerator having multi-staged rotary kiln with at least two rotating sections located in sequence. During incineration of low BTU solids, at least one auxiliary burner is fired into each section. Solid waste is initially treated in the first rotating section which may have a smaller diameter wherein waste is heated with the primary auxiliary burner(s) firing at the charging end of the first firing section. The solid residue leaves the first rotating section and further enters the following rotating section located in such a way that the exit opening of the first rotating section communicates with the entering opening of the second rotating section. The second rotating section is heated by a secondary auxiliary burner(s) firing in the second section. The combustion product from the primary auxiliary burner(s) is travelling concurrently with the waste stream moving along the first rotating section and the combustion product from the secondary auxiliary burner(s) is travelling concurrently or countercurrently with the waste stream moving along the second rotating section. The second rotating section may have a substantially larger diameter, may be rotated with the same rotating speed and slope than the first rotating section or with different speed and slope.

The level of energy introduced with auxiliary burners of each rotating section and the amount of excess oxygen present in the combustion product of these burners may be varied to further increase the flexibility of temperature control inside these rotating sections. Two different oxidizing gases (one is air and the other is oxygen or oxygen-enriched air) can be used by said burners to increase the heat available per cubic foot of combustion products generated with the auxiliary burners by reducing the amount of ballast nitrogen being introduced with the oxidizing gases utilized by the burners.

When only two rotating section are used, the bottom ash is discharged from the exit end of the second rotating section. Flue gases are discharged at the same end of the kiln when concurrent firing is used or through the opening in a non-rotated wall located between two sections when countercurrent firing is used in the second section.

To provide an additional portion of oxygen to oxidize the combustible components of solid waste, an additional oxidizing gas can be introduced by injector means placed in the non-rotated walls located at the entering and/or exiting ends of the rotary sections of said multi-sectional rotary kiln. The level of excess oxygen supplied with said additional oxidizing gas together with excess hot oxygen supplied in the burners' flame may be varied independently to further increase flexibility of temperature control and partial pressure of oxygen along the length of the kiln.

To reduce NOx formation by auxiliary burners, they may operate at a substoichiometric ratio so that the oxygen supplied inside of the kiln interior with the additional auxiliary oxidizing gas will be used to oxidize the residual combustible components of the auxiliary flame(s) in addition to oxidation of combustible components of solid waste.

Noncontaminated fuel and/or contaminated fluid waste material can be used as a fuel by the auxiliary burners. Fluid waste also can be injected separately through one or more injector means placed through non-rotating wall(s) located at the end(s) of the rotating section(s). Control of the amount of fluid waste injected through the injector(s) is provided for improved temperature distribution along the length of the kiln. Therefore, the flame characteristics, temperature of the gaseous kiln atmosphere, oxygen content, rotation speed, and slope for the first rotating section may be independently controlled to maximize the heat flux to contaminated solid waste being treated in the first section. The flame characteristics, temperature of the gaseous kiln atmosphere, oxygen content of the atmosphere, rotation speed, and the slope of the second rotating section may be independently controlled to insure proper temperature distribution inside of decontaminated residue bed exiting the last rotating section, providing an environmentally safe level of any remaining hazardous organics in the discharged residue at the hot discharging end of the last rotating section during continuous operation of the incinerator and minimizing slag agglomeration on the kiln walls for the rotating section kilns operating in a non-slagging mode.

When solid residue is to be converted into unleachable environmentally safe slag, the last rotating portion of the multi-staged kiln should operate in a slagging fashion while still preventing slag agglomeration on the walls of upstream kiln sections by maintaining desirable distribution of heat flux to the moving solid bed along the entire kiln length.

Injection of an aqueous waste stream, cooling water, or air stream through the non-rotating sections may be used to reduce the temperature of the flue gases when needed to prevent local kiln overheating. Injection of lime and other chemically active solid streams through at least one non-rotating section can be employed to mix with solid residue downstream of the first rotating section to provide for an in-bed scrubbing effect to reduce the amount of acid gases leaving the last rotating section.

Flux material can be injected at the entering end of the last rotating section when the slagging mode of operation is used.

The distribution of the heat released by the auxiliary burners between the rotating sections results in a reduction in volume of auxiliary combustion products travelling along the first rotary kiln section. This reduces the velocity of gases and results in less fly ash carry-over during the initial drying and heating of solid waste.

The substantially larger diameter of the rotating section(s) located downstream from the first section may be used to create heat transfer conditions inside the solid bed travelling along the section(s) differing significantly from the first section. When solid residue is sensitive to slag formation, such process flexibility is essential to maximize system throughput and to minimize system downtime by preventing slag build ups. Intensive heating of the solid bed in the first rotary section may be maintained without a negative impact on the temperature control inside of the solid bed being treated in the subsequent rotary sections.

In cases where a rotary kiln incinerator operates producing unleachable slag, the multiple kiln arrangement may be used to limit slag formation to the last rotary section. This limitation of slag formation will minimize the need for relining the entire kiln during shutdown periods due to excessive refractory wearing occurring only at the last slagging section.

When solid waste consists of a substantial amount of bound nitrogen contributing to NOx formation during incineration, at least one rotating section of the kiln may be used for NOx reburning with an injected reducing agent such as ammonia, natural gas, or other. This injection will provide an atmosphere actively reacting to reduce nitrogen oxides to nitrogen.

Injection of an auxiliary solid combustible material or waste may be distributed along the kiln length utilizing a non-rotating refractory section(s) located at the entrance and exit ends of the rotating sections for placement of the injecting means. Some of these non-rotating sections can be used to exhaust part or all kiln gases through the exhaust opening, and further direct them to the afterburner and/or toward the rotating section located downstream from the exhaust opening.

The present invention overcomes such generic kiln limitations by the use of a modified kiln design. The location of the auxiliary burner and optimized distribution of additional oxygen along the kiln length is aimed to optimize heating intensity of the solid bed travelling along the entire kiln. The modified kilns should find multiple applications for incinerators used for the cleanup of contaminated wastes having different chemistry, water content, and slagging sensitivity, etc.

The present rotary kiln incinerator provides a high level of throughput capacity for a variety of wastes due to the wide controllability of the staged injection of oxidizing and/or reducing substances and the heat flux deliverable from the plurality of auxiliary burners to the solid residue layer treated along the length of the multisectional rotary kiln having at least two rotating sections.

Enhanced controllability of the temperature distribution inside the solid residue bed is provided to maximize the heat absorption capability of the bed while preventing slagging and undesirable agglomeration of hot solid particles. This enhancement is accomplished through improved control of the solid bed internal mixing which provides for increased heat transfer inside of the moving bed.

The auxiliary burners are operated to provide staged heat release along a kiln consisting of at least two independently rotating sections so as to maintain, when needed, the optimum heat flux from the auxiliary flames to the solid bed and the exposed refractory lining so as to match the limited heat absorption capability of a moving bed without undesirable local overheating. The speed and the slope of the multiple kiln sections are varied to enhance the flexibility of the temperature control and heat transfer inside of the solid residue bed and to optimize the heat transfer from the auxiliary burners to the solid waste being treated.

Oxygen may be used by the burners in addition to air for oxidation of the auxiliary fuel to enhance the heat transfer from the auxiliary flames and to reduce the combustion volume and therefore superficial velocity and fly ash carry-over. The heat input from auxiliary burners which may be located at the one or both ends of each multiple kiln section and/or inside of the kiln provides the improved temperature distribution along the kiln sections needed to maximize throughput capacity.

Staged introduction of an additional oxidizing gas to burn combustible components of the solid waste stream may be used to further complement temperature control along the entire kiln length. The additional oxidizing gas containing air and/or oxygen may be directed toward each kiln section interior through combustion chambers of auxiliary burners and/or by at least one injection means to control the distribution of heat released by waste burning along multiple kiln sections.

During operational upsets caused by excessive charging which result in a transient depletion of oxygen and/or loss of negative pressure in the system, the rotation of the first charging section, the firing rate and/or the injection of an additional oxidizing gas and/or liquid cooling stream to at least one of the rotating sections can be altered without termination of charging. This response capability negates the requirement to slow down the incineration process and prevents transient releases of hazardous materials to the environment. The distribution of the temperature inside the rotating bed and the oxygen mass transfer from kiln atmosphere should reliably decontaminate the ash or slag being discharged from the exiting end of the last rotating section.

The described herein multi-sectional kiln consisting slagging section is also applicable for incineration of contaminated metal scrap wherein a metallic melt residue can be discharged from hot discharging end of last kiln. The exhaust gases from such multi-sectional kiln should be decontaminated to become environmentally safe prior to discharge to atmosphere. Afterburner combustion chamber should be preferably used downstream of kiln to reliably provide for additional oxidation of any hazardous combustible components of kiln exhaust below environmentally required level.

The optimum operating parameters of the last rotating section should always be maintained to provide reliable decontamination of hot residue from any hazardous organic to a below environmentally required level prior to discharging from the exit end of the last section.

BRIEF DESCRIPTION OF THE DRAWINGS

FIG. 5 is a side view through the center of the burner used in the third embodiment as shown in FIG. 4.

FIG. 6 is a cross-sectional view of the burner shown in FIG. 5 taken along line 2—2.

DETAILED DESCRIPTION OF THE PREFERRED EMBODIMENT

Figure 1:
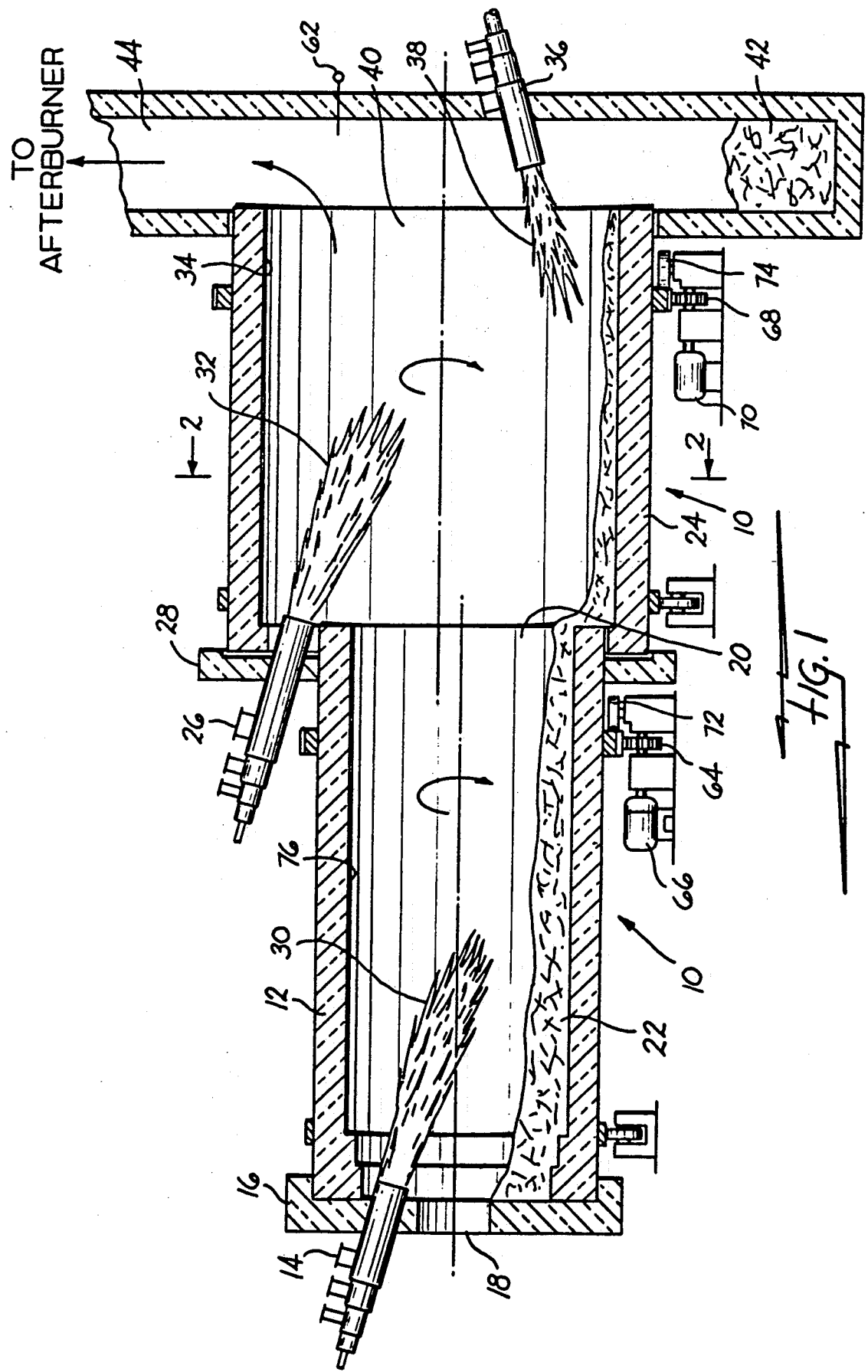
FIG. 1 is a side section view through the center of a first embodiment of the present invention.
Figure 2:
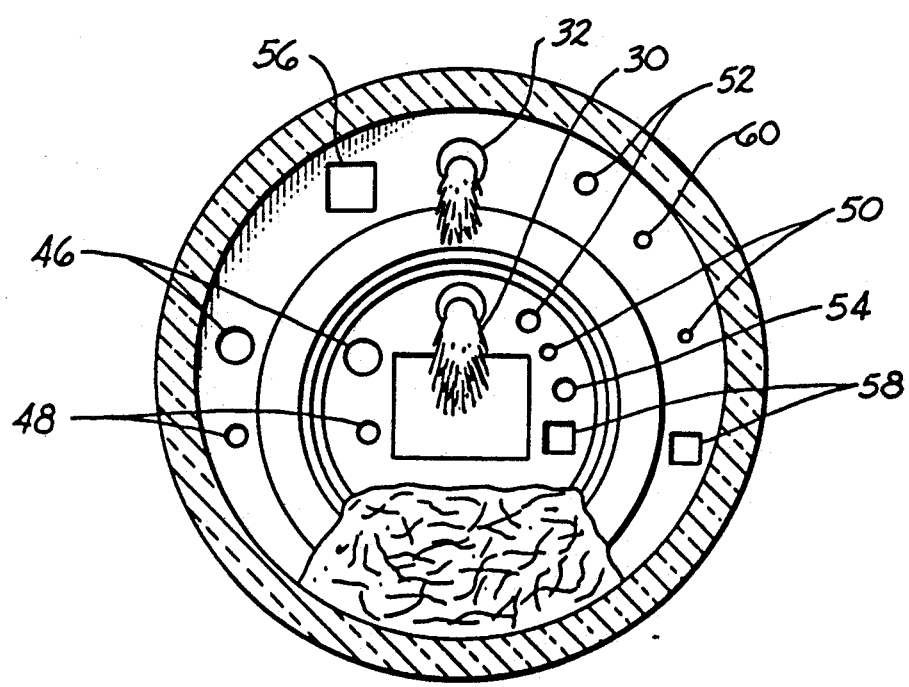
FIG. 2 is a cross-sectional view of the embodiment shown in FIG. 1 taken along line 2—2.

FIGS. 1 and 2 show details of a first preferred embodiment of the present invention. A rotary kiln 10 comprises a first rotating section 12 equipped with a first auxiliary burner 14, which is used to introduce a first flame 30 and is installed at a waste receiving end 16 of the first section 12. The first rotating section 12 has an entering opening 18 for the introduction of solid waste, and an exit opening 20 for discharging solid waste residue 22 from the first rotating section 12 into a second rotating section 24. The second rotating section 24 is equipped with a second auxiliary burner 26 which is installed through unmovable wall 28 and is used to introduce a second flame 32 inside the interior of the second section 24. Hot solid residue 22 is further heated on the refractory lined wall 34 of second section 24.

The second rotating section 24 may be equipped with an optional burner 36 to introduce an optional flame 38 inside the second section 24 through a discharging end 40. The discharging end 40 communicates with the bottom ash collecting means 42 which is used to collect decontaminated solid residue 22 being discharged from the second rotating section 24. Slag collecting means would be used in place of bottom ash collecting means 42 where a slagging kiln is used. A flue 44 is used to direct secondary flue gases leaving the second rotating section 24 toward an afterburner's refractory lined chamber (not shown) to finalize oxidation of gaseous combustible components possibly contained in the flue gases.

Optionally more than one auxiliary burner may be installed in the first and second rotating sections 12 and 24 for generating combustion products therein. Such combustion products should include at least 10% oxygen. These sections 12 and 24 also may be equipped with oxidizing gas injectors 46 for introducing controllable amounts of additional oxidizing gas such as air, oxygen or oxygen-enriched air, preferably, the oxidizing gas contains at least 21% oxygen. In addition, these sections may be equipped with aqueous waste injectors 48, cooling water injectors 50, fluid waste fuel injectors 52, a reducing agent injector 54, an auxiliary combustible material injector 56, and scrubbing solid material injectors 58 for introducing a solid charge into the sections. Preferably, the solid charge introduced includes at least 10% water and some lime or limestone. The solid charge may also include solid residue from the hazardous waste incinerator. The temperature of the gaseous atmosphere in each rotating section may be measured by thermocouples 60 and 62.

The first rotating section 12 is equipped with a first driving gear 64 moved by a first motor 66 with controllable rotating speed selected to maximize heat transfer of the solid residue 22. The second rotating section 24 is equipped with a second driving gear 68 moved by a second motor 70 with controllable rotating speed selected to optimize heat transfer inside the second rotating section 24.

Supporting rollers 72 and 74 are adjusted to support the first and second rotating sections 12 and 24 with slight adjustable slopes which can be similar or different for the first and second rotating sections 12 and 24.

The burners 14, 26 and 36 may use air as the sole oxidizer or may use pure oxygen or oxygen-enriched air. They also may use oil, gaseous fuel and/or liquid waste as an auxiliary fuel.

In operation, rotary kiln 10 receives solid waste residue 22 through charge opening 18. Solid residue 22 is moved on rotating wall 76 along the first rotating section 12 toward discharging end 40. First auxiliary burner 14 is fired inside the first rotating section 12 so that combustion productions of the burner 14 are moving along said first rotating section 12 in concurrent direction with the solid residue 22. The rotation speed of this section 12 depends on the solid waste characteristics and is typically in the range of 0.2–6 rotations per minute. The firing rate of the first auxiliary burner 14 is controlled to support the temperature of the flue gases, measured by thermocouple 60, at a preset level which is typically selected to be between 1200° F. and 2200 ° F. The slope of the first rotating section 12 is set for a given waste stream and maintained constant during the entire operation with the given waste stream.

The firing rate of the second auxiliary burner 26 is typically controlled to support the temperature of the flue gases measured by thermocouple 62 at a present level, which is typically selected based on waste characteristics to be between 1400° F. and 2200° F. The amount of excess oxygen in the flue gases may be optionally controlled by preset flow of additional oxidizing gas delivered through the auxiliary burners 26 and 36 through injectors 46.

Figure 3:
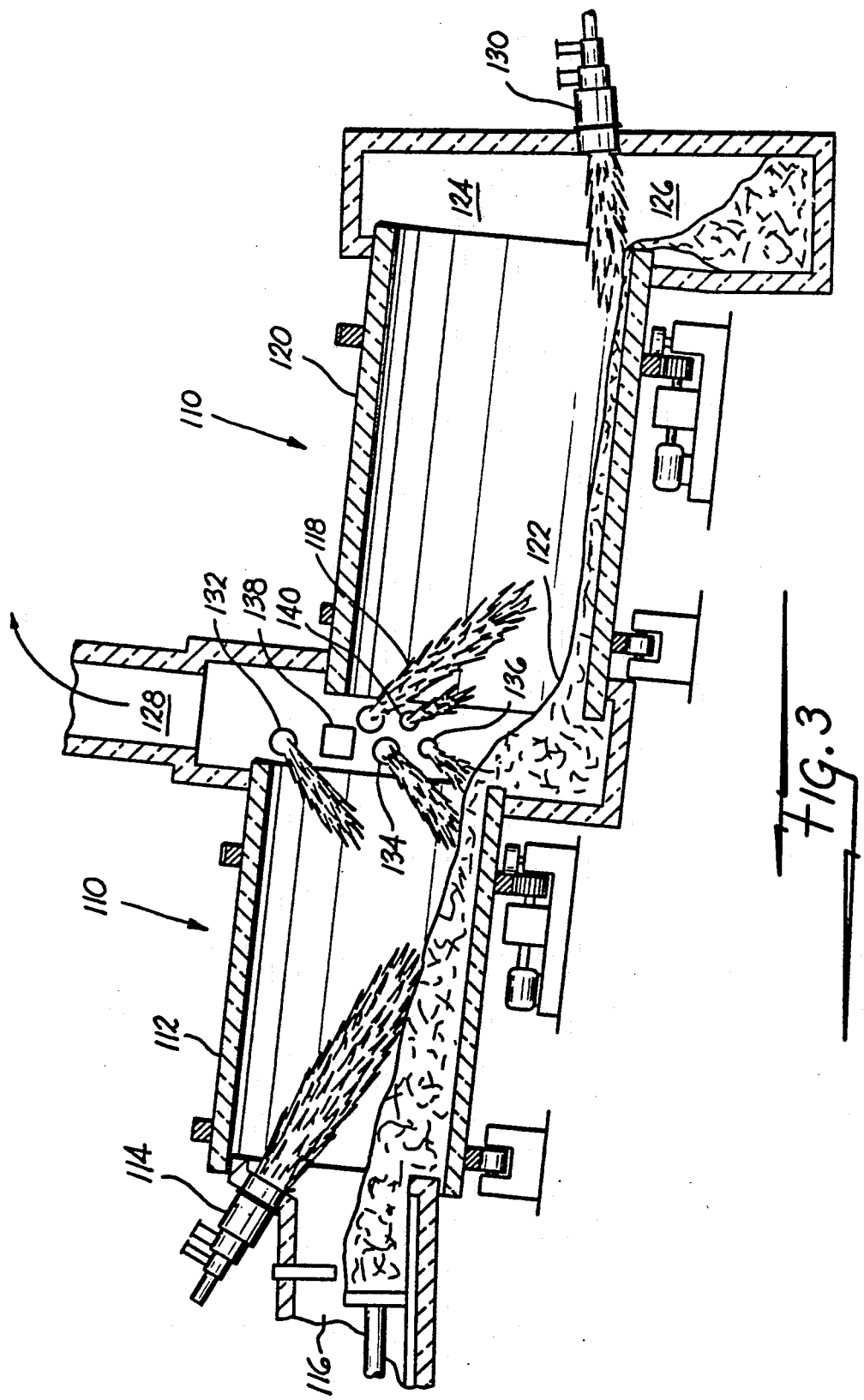
FIG. 3 is a side view through the center of a second embodiment of the present invention.

FIG. 3 shows details of a second preferred embodiment of the present invention. A rotary kiln 110 includes a first rotating section 112 equipped with a first auxiliary burner 114 installed at receiving end 116 of the first section 112. A second auxiliary burner 118 is installed to introduce heat at least partially to a second rotating section 120 which receives solid residue 122 being previously treated in the first rotating section 112 and further discharges this residue 122 through a discharging end 124 communicating with a bottom ash collecting means 126. A flue 128 is used to direct secondary flue gases toward an afterburner refractory lined chamber (not shown) to finalize the oxidation of gaseous combustibles.

Further, an optional burner 130 may be installed at the discharging end 124 of the second rotating section 120. Sections 112 and 120 may also be equipped with injectors 132, 134, 136, 138 and 140 used to introduce controllable amounts of oxidizing gas and/or aqueous waste and/or cooling water and/or lime or limestones and/or fluid waste stream. Rotation speed and slope of the first and second rotating sections 112 and 120 may be maintained differently. Preferably, the rotation speed and slope of the second rotation section 120 will exceed the speed and slope of the first section 112.

In operation, rotary kiln 110, controls the distribution of the heat flux from the flames of the auxiliary burners 114, 118 and 130 to the solid residue 122 similar to that described above for kiln 10. Controllable amounts of additional oxygen may be delivered with flames provided by burners 114, 118 and 130 to burn combustible components of solid residue 122 along the length of kiln 110.

Figure 4:
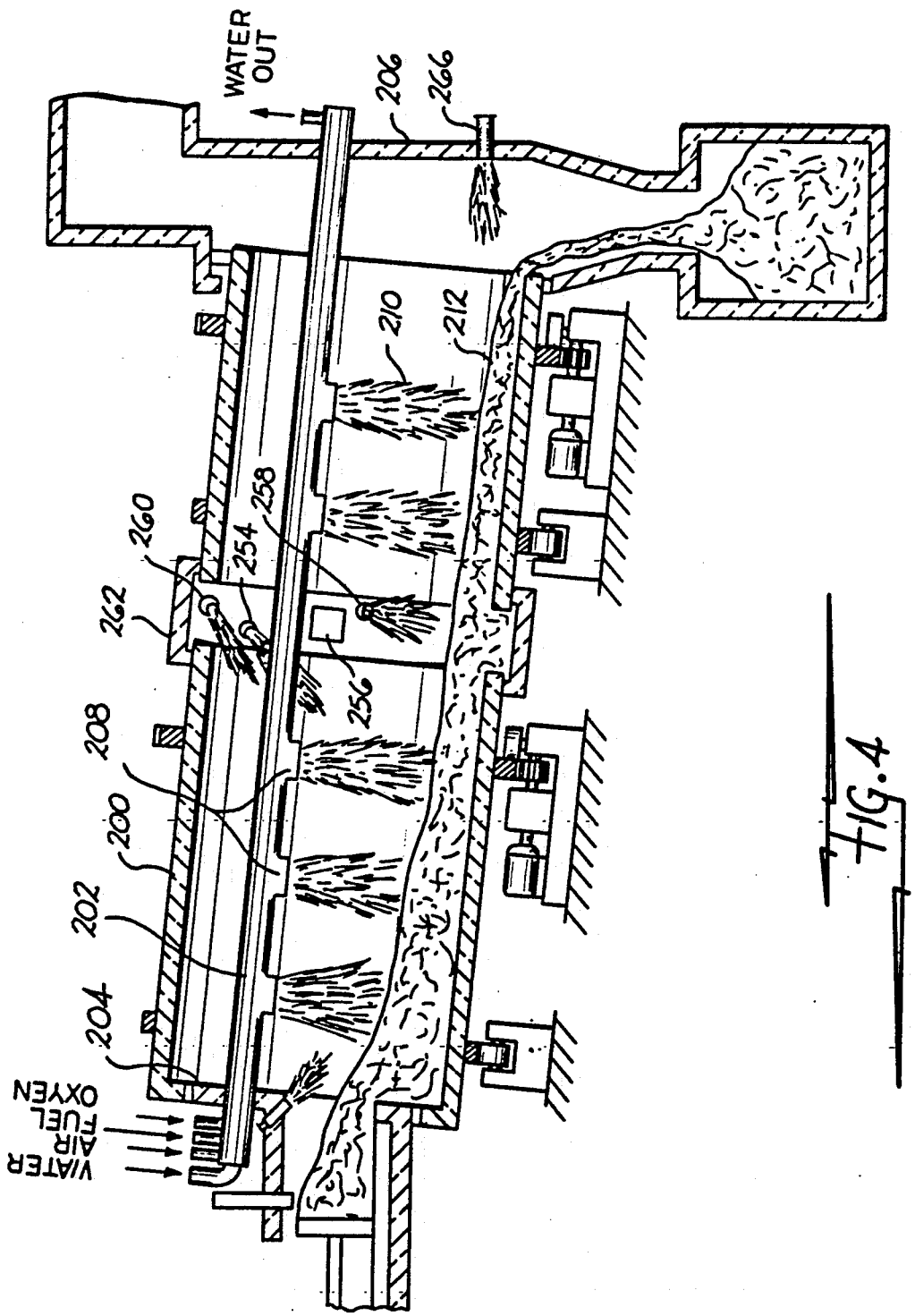
FIG. 4 is a side view through the center of a third embodiment of the present invention.
Figure 7:
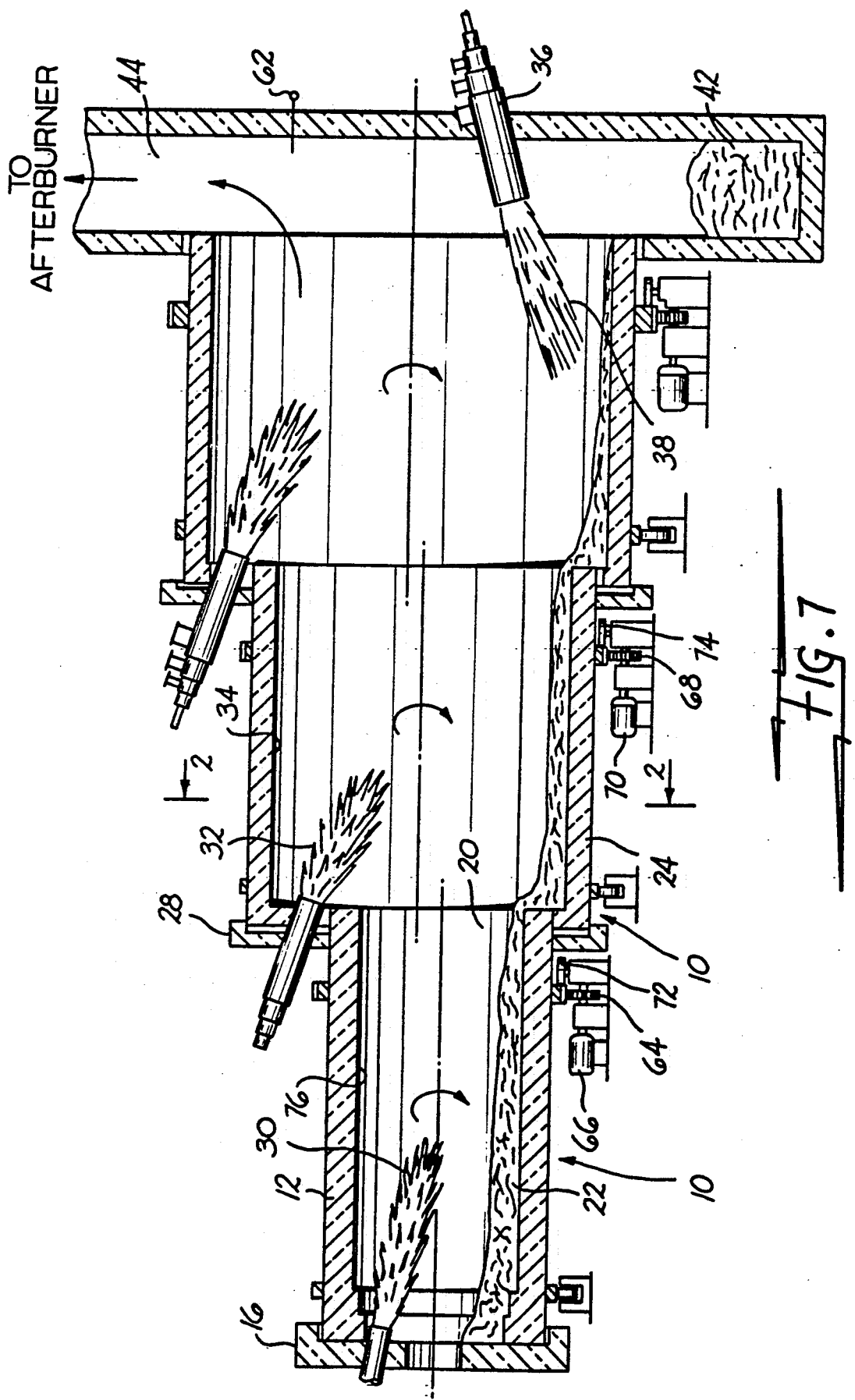
FIG. 7 is a side sectional view of the device of the present invention having a rotating section located sequential to a second rotating section.

FIG. 4 shows details of a third embodiment of the present invention wherein multiple heating zones are arranged inside of a multi-sectional kiln 200 by use of a specially designed burner 202. The burner 202 is installed through non-rotating walls 204 and 206 and includes a plurality of nozzles 208 for directing a flame envelope 210 to impinge on solid residue 212 to maximize heat transfer from the flame envelope 210 and mass exchange between the solid residue 212 and the oxygen contained in the combustion products of burner 202. The details of burner 202 are shown in FIGS. 5 and 6.

Burner 202 includes a water-cooled pipe 214 having several openings 216 for flame discharge from water-cooled combustion chambers 218 using fuel, air, and oxygen separately introduced into combustion chambers 218 through channels 220, 222 and 224, which are communicated with burner oxygen, fuel, and air or oxygen-enriched air plenums 226, 228 and 230. These plenums 226, 228 and 230 are connected to supply conduits 232, 234 and 236, which are communicated with fuel, oxygen and air controllable supply means (not shown). Cooling water is supplied to inlet 238 and discharged from outlet 240. The amount of fuel, oxygen, and air supplied to each combustion chamber 218 may be separately controlled to provide better control of heat and excess oxygen input along the length of the kiln 200. The flame envelopes 210 are divided into groups. Each group fires in one of the rotating sections so that the heat input per section can be separately controlled and supplied through separate supply conduits 232, 234 and 236.

Burner 202, as shown in FIGS. 5 and 6, operates in kiln 200 having two rotating sections and includes a secondary group of supply conduits 242, 244 and 246 for fuel, oxygen and air or oxygen-enriched air, in addition to water supply line 248, and water discharge line 250. Air or oxygen-enriched air supplied to the burner 202 utilizes the interior of the water-cooled pipe 214 as supply conduit 236. Divider 252 is used to separate air supplied to one group of burners from the other.

Multiple injector means 254, 256, 258 and 260 are installed throughout non-rotating end wall 262 for the introduction, when required, of additional oxidizing gas, reducing gas for NOx reburning, cooling water, additional waste stream, scrubbing, and fluxing material.

Improved control over temperature distribution can be achieved through the utilization of multi-flame burner 202. In addition to improved heating efficiency, the enhancement of the mass transfer of oxygen along the kiln 200 length is provided by directing excess oxygen contained in the combustion products of burner 202 to impinge the solid residue 212. The resulting heat input from oxidation of combustible components of the solid residue 212 with this additional oxygen is controlled through controllable distribution of additional oxygen between flame envelopes 210.

When solid waste is incinerated in kiln 10, 110, or 200 and the ash residue has a low temperature slagging point, the temperature in the rotating sections is controlled at a reduced value, approximately 1400° F. to 1600° F. A significant amount of cooling air may be introduced through injector means 264 and/or 266 located at the entering end and downstream of the second rotating section, as shown in FIG. 4.

When wet low BTU waste is incinerated, the burner(s) firing in the last rotating section may be used to fire with a very high level of excess air or oxygen so that the adiabatic temperature of auxiliary flame(s) is maintained below 1800° F. preventing solid bed overheating and delivering hot excess oxygen to the bed to finalize rapid oxidation of residual hazardous organics at relatively low temperature to prevent slag formation.

When high BTU wastes having high water content are incinerated in kiln 10, 110 or 200, the first rotating chamber is used to dry the waste, and the second is used to burn the dried waste. With such wastes, the first rotating section of the auxiliary burner is fired at a substantial firing rate and the second auxiliary burner is used only as an ignition pilot source. Substantial excessive oxygen is provided through this auxiliary burner which is fired in the second rotating section and throughout the injector placed at the non-rotating wall located between the first and second rotating sections. Multiple burners and injectors may be used.

Aqueous waste or cooling water may be injected through one or more aqueous injector means located at each rotating section to moderate a temperature rise due to the excessive amount of BTUs released by waste burning inside the rotating section(s).

The speed of the second rotating sections of kilns 10, 110 and 200 may be maintained higher than the speed of the first section when a substantial reduction of the solid bed thickness is needed in the second rotating section. This reduction of the thickness of the solid bed is used to speed heat transfer inside of the solid bed, to provide the minimum temperature variation inside of the solid bed, and to reduce the concentration of contaminated organics to levels needed to meet environmental regulation.

When the slagging arrangement is used, the solid residue bed's intensive heating and melting is accomplished in the last rotating section of kiln 10, 110 or 200. The amount of heat introduced in the last rotating section by the auxiliary burner(s) and by oxidation of combustible components arriving with and from the solid waste is sufficient. The heat transfer to the slagging layer is maintained adequately to melt the residue.

To further increase the efficiency of slagging, a fluxing material can be added to reduce the melting point of slag.

When rotary kilns 10, 110 and 200 are operating to incinerate wastes containing or forming acid gases, the scrubbing agent (lime or other) may be injected with injector means located through the non-rotating section of the rotary kiln to reduce the amount of acid gases leaving the rotary kiln.

When rotary kilns 10, 110 and 200 are operating to incinerate the waste with substantial nitrogen content, the reducing gas (such as ammonia, natural gas, propane, etc.) may be injected with a dedicated injector means to reduce NOx to nitrogen. When combustible solid waste material, hazardous or non-hazardous, is to be used as an auxiliary fuel, this material can be introduced with solid waste being incinerated and/or introduced through dedicated injecting means of kilns 10, 110 and 200.

What is claimed is:

1. A device for incinerating solid waste, comprising:
   (a) a first rotating section for transporting solid waste within the device, the first rotating section having a forward opening at a first end thereof for introducing waste into the device and an exit opening at a second end thereof;
   (b) first burning means for heating and at least partially volatizing components of the waste in the first rotating section to produce flue gases and hot residue;
   (c) a second rotating section for further transporting waste residue within the device, and second rotating section having a forward opening at a first end thereof and an exit opening at a second end thereof, wherein the exit opening of the first rotating section is in flow communication with the forward opening of the second rotating section;
   (d) means for providing first oxidizing gas to the first rotating section to at least partially burn the volatized components of the waste;

(e) second burning means for increasing the temperature of waste residue in the second rotating section to further convert said waste residue into substantially decontaminated solid residue and flue gas;

(f) means for collecting substantially decontaminated solid residue from the device; and (g) means for removing flue gases from the device.

2. A device for incinerating hazardous waste, as recited in claim 1, further comprising at least one additional rotating section located adjacent and sequential to the second rotating section.

3. A device for incinerating solid waste, as recited in claim 1, further comprising means for providing a second oxidizing gas into the second rotating section.

4. A device for incinerating solid waste, as recited in claim 3, wherein the means for providing a second oxidizing gas includes oxidizing gas injection means.

5. A device for incinerating solid waste, as recited in claim 3, wherein the second oxidizing gas includes air.

6. A device for incinerating solid waste, as recited in claim 3, wherein the second oxidizing gas stream includes at least 21% oxygen.

7. A device for incinerating hazardous waste, as recited in claim 1, further comprising means for injecting an aqueous liquid into at least one of the rotating sections.

8. A device for incinerating hazardous waste, as recited in claim 1, further comprising means for introducing a solid charge into at least one of the rotating sections.

9. A device for incinerating hazardous waste, as recited in claim 8, wherein the solid charge includes limestone.

10. A device for incinerating hazardous waste, as recited in claim 8, wherein the solid charge includes at least 10% water.

11. A device for incinerating hazardous waste, as recited in claim 1, wherein at least one of the burning means comprises a plurality of burners.

12. A device for incinerating hazardous waste, as recited in claim 1, further comprising additional burning means disposed in the second end of the second rotating section for generating combustion products to further heat hazardous waste.

13. A device for incinerating hazardous waste, as recited in claim 12, wherein the combustion products generated by the additional burning means include at least 10% oxygen.

14. A device for incinerating solid waste, comprising:

(a) a first rotating section for transporting solid waste within the device, the first rotating section having a forward opening at a first end thereof for introducing solid waste into the device and an exit opening at a second end thereof, wherein the first rotating section rotates at a controlled frequency around a central axis and slopes downwardly from the first end to the second end;

(b) first burning means for heating and at least partially volatizing components of the solid waste to generate first flue gases and hot solid residue in the first rotating section;

(c) means for providing first oxidizing gas to the first rotating section to at least partially burn the volatized components of the solid waste;

(d) a second rotating section for transporting the first flue gases and the hot solid residue within the device, the second rotating section having a forward opening at a first end thereof and an exit opening at a second end thereof, wherein the exit opening of the first rotating section is in flow communication with the forward opening of the second rotating section such that the first flue gases and the hot solid residue can flow out of the exit opening of the first rotating section and enter the forward opening of the second rotating section;

(e) a nonmovable wall disposed about the second end of the first rotating section and adjacent to the first end of the second rotating section;

(f) second burning means disposed in the nonmovable wall such that the second burning means generates combustion products directed inside the second rotating section to increase the temperature of the hot solid residue therein for producing substantially decontaminated residue and second flue gases;

(g) means for collecting the residue, said means disposed at the exit opening of the second rotating section for removing substantially decontaminated residue; and (h) means for removing second flue gases from the device, said means disposed at the exit opening of the second rotating section.

15. The device for incinerating hazardous waste, as recited in claim 14, further comprising additional burning means for generating additional combustion products inside the second rotating section to further heat the hot solid residue therein, the means being disposed along the second end of the second rotating section.

16. The device for incinerating hazardous waste, as recited in claim 14, further comprising means for injecting oxidizing gas inside at least one of the rotating sections.

17. The device for incinerating hazardous waste, as recited in claim 14, further comprising means for injecting aqueous liquid inside at least one of the rotating sections.

18. The device for incinerating hazardous waste, as recited in claim 14, further comprising means for introducing a solid charge inside at least one of the rotating sections.

19. The device for incinerating hazardous waste, as recited in claim 14, further comprising:

(a) first means for controlling the rate of rotation of the first rotating section; and (b) second means for controlling the rate of rotation of the second rotating section.

20. A device for incinerating hazardous waste, as recited in claim 14, further comprising means for adjusting the downward slope of the first rotating section.

21. A device for incinerating hazardous waste, as recited in claim 14, further comprising second means for adjusting the slope of the second rotating section.

22. A device for incinerating solid waste, comprising:

(a) a first rotating section for transporting solid waste within the device, the first rotating section having a forward opening at a first end thereof for introducing waste into the device and an exit opening at a second end thereof, wherein the first rotating section rotates at a controlled frequency around a central axis and slopes downwardly from the first end to the second end;

(b) a second rotating section for further transporting waste within the device, the second rotating section having a forward opening at a first end thereof and an exit opening at a second end thereof;

(c) a nonmovable wall for connecting the exit opening of the first rotating section with the forward opening of the second rotating section; and (d) a plurality of burning means for heating the components of waste inside the first rotating section to produce a hot solid residue and first flue gases, and to subsequently produce combustion products inside the second rotating section to generate substantially decontaminated solid residue and second flue gases to an environmentally safe level; and (e) means for providing first oxidizing gas to the first rotating section to at least partially burn the heated components of hazardous waste.

23. A device for incinerating solid waste, comprising:

(a) a first rotating section for transporting solid waste within the device, the first rotating section having a forward opening at a first end thereof for introducing solid waste into the device and an exit opening at a second end thereof, wherein the first rotating section rotates at a controlled frequency around a central axis and slopes downwardly from the first end to the second end;

(b) first burning means for generating combustion products to heat and at least partially volatize components of the solid waste to produce first flue gases and hot solid residue in the first rotating section;

(c) a second rotating section for further transporting hot solid residue waste within the device, the second rotating section having a forward opening at a first end thereof and an exit opening at a second end thereof, wherein the exit opening of the first rotating section communicates with the forward opening of the second rotating section such that hot solid residue can flow out of the exit opening of the first rotating section and enter the forward opening of the second rotating section;

(d) second burning means for producing combustion products directed into the first end of the second rotating section to further heat the hot solid residue inside the second rotating section to increase the temperature of the hot solid residue therein for generating substantially decontaminated solid residue and second flue gases to a predetermined level;

(e) means for removing the first and second flue gases from the device, said means disposed at the exit opening of the first rotating section for exhausting flue gases from the device; and (f) means for collecting decontaminated solid residue, the means disposed at the exit opening of the second rotating section for removing the substantially decontaminated solid residue.

24. A method of incineration of solid waste, comprising the steps of:

(a) directing the solid waste into a receiving end of a first rotating section of a kiln having a plurality of kiln sections;

(b) heating the solid waste inside the first rotating section to at least partially volatize the components of the solid waste to produce first flue gases and hot solid residue;

(c) providing first oxidizing gas to the first rotating section to at least partially burn the volatized components of the solid waste;

(d) moving the first flue gases and the hot solid residue along the first rotating section in a concurrent fashion;

(e) rotating the first rotating section having the first flue gases and the hot solid residue with a controlled frequency around its central axis slightly angled from the receiving end down toward a second rotating section in flow communication with the first rotating section;

(f) directing the first flue gases and the hot solid residue from the first rotating section into a second rotating section;

(g) heating the solid residue inside the second rotating section to increase the temperature of the hot solid residue therein to further decontaminate the hot solid residue and produce second flue gases;

(h) rotating the second rotating section with controlled frequency around its central axis slightly angled from the receiving end down toward a discharging end of the second rotating section; and (i) discharging the hot solid residue from the second rotating section.

25. The method of claim 24, further comprising the step of combusting the flue gases of the second rotating section in afterburner means to ensure the reduction of hazardous organic components, soot, and CO in the first flue gases and the second glue gases exiting the afterburner means below a predetermined level.

26. The method of incineration of claim 24, further comprising the step of providing a second oxidizing gas toward the interior of the second rotating section.

27. The method of incineration of claim 26, wherein said second oxidizing gas is provided inside the rotating second section through oxidizing gas injection means.

28. The method of incineration of claim 26, wherein the second oxidizing gas is air.

29. The method of incineration of claim 26, wherein the second oxidizing gas is at least 21% oxygen.

30. The method of incineration of claim 24, comprising the step of injecting an aqueous liquid inside of at least one of the rotating sections.

31. The method of incineration of claim 24, comprising the step of introducing a solid charge in at least one of the rotating sections.

32. The method of incineration of claim 31, wherein the solid charge includes limestone.

33. The method incineration of claim 31, wherein the solid charge includes lime.

34. The method of incineration of claim 31, wherein the solid charge includes at least 10% water.

35. The method of incineration of claim 31, wherein the solid charge includes a solid residue from a hazardous waste incinerator.

36. The method of incineration of claim 24, wherein the step of heating the hazardous waste includes firing a first burning means into the first rotating section.

37. The method of incineration of claim 24, wherein the step of heating the hot solid residue includes firing a second burning means into the second rotating section.

38. The method of incineration of claim 23, wherein the steps of heating the hazardous waste and heating the hot solid residue include firing a plurality of burners into the first and second rotating sections.

39. The method of incineration of claim 24, which further comprises the step of firing an additional burning means through the discharging end of the second rotating section to generate combustion products.

40. The method of incineration of claim 39, wherein combustion products generated by the additional auxiliary burning means include at least 10% oxygen.

41. The method of incineration of claim 35, wherein the first burning means is controlled to maintain a desired temperature inside the first rotating section.

42. The method of incineration of claim 37, wherein the second burning means is controlled to maintain a desired temperature of the additional flue gases.

43. The method of incineration of claim 26, wherein the content of oxygen in the additional flue gases is controlled by controlling the amount of oxygen being introduced by the auxiliary oxidizing gas.

44. The method of incineration of claim 43, wherein the content of oxygen in the additional flue gases is further controlled by controlling the amount of nitrogen being introduced by the auxiliary oxidizing gas.

45. A method of incineration of solid waste, comprising the steps of:
 (a) directing the solid waste into a receiving end of a first rotating section;
 (b) firing first burning means into the first rotating section for generating combustion products to heat and at least partially volatize components of the solid waste to generate first flue gases and hot solid residue in the first rotating section;
 (c) providing first oxidizing gas to the first rotating section to at least partially burn the volatized components of the solid waste;
 (d) moving the first flue gases and the hot solid residue along the first rotating section in a concurrent fashion;
 (e) rotating the first rotating section having the first flue gases and the hot solid residue with a controlled frequency around the central axis of the first rotating section slightly angled from the receiving end down toward the second rotating section in flow communication with the first rotating section;
 (f) directing the first flue gases and the hot solid residue through a discharging end of the first rotating section and into a receiving end of a second rotating section, the second rotating section rotatable with controlled frequency around the central axis of the second rotating section slightly angled from the receiving end down toward a discharging end of the second rotating section;
 (g) firing second burning means into the second rotating section for generating combustion products to increase the temperature of the hot solid residue therein to produce substantially decontaminated solid residue and second flue gases;
 (h) discharging the substantially decontaminated solid residue from the second rotating section; and
 (i) removing the second flue gases through the discharging end of the second rotating section and directing said flue gases toward afterburner means.

46. A method of incineration of solid hazardous waste, comprising the steps of:
 (a) directing the hazardous waste into a receiving end of a first rotating section;
 (b) firing first burning means inside the first rotating section for generating combustion products to heat and at least partially volatize hazardous waste to generate first flue gases and hot solid residue in the first rotating section;
 (c) moving the first flue gases and the hot solid residue along the first rotating section in a concurrent fashion;
 (d) rotating the first rotating section having the first flue gases and the hot solid residue with a controlled frequency around the central axis of the first rotating section slightly angled from the receiving end down toward the second rotating section in flow communication with the first rotating section;
 (e) removing the first flue gases with afterburner means between the discharging end of the first rotating section and the receiving end of the second rotating section to ensure the reduction of hazardous organic components, soot, and CO in the first flue gases exiting the afterburner means below a predetermined level;
 (f) directing the hot solid residue through a discharging end of the first rotating section and into a receiving end of a second rotating section, the second rotating section rotatable with controlled frequency around the central axis of the first rotating section slightly angled from the receiving end down toward a discharging end of the second rotating section;
 (g) firing second burning means inside the second rotating section for generating combustion products to increase the temperature of the hot solid residue therein to produce decontaminated solid residue and second flue gases;
 (h) discharging the decontaminated solid residue from the second rotating section; and
 (i) removing the second flue gases with afterburner means between the discharging end of the first rotating section and the receiving end of the second rotating section to ensure the reduction of hazardous organic compounds, soot, and CO in the first flue gases exiting the afterburner means below a predetermined level.

47. A device for incinerating solid waste, as recited in claim 1, wherein the means for providing a first oxidizing gas includes oxidizing gas injection means.

48. A device for incinerating solid waste, as recited in claim 1, wherein the first oxidizing gas includes air.

49. A device for incinerating solid waste, as recited in claim 1, wherein the first oxidizing gas includes at least 23% oxygen.

50. A device for incinerating solid waste, as recited in claim 3, wherein the oxygen content of the first oxidizing gas is less than the oxygen content of the second oxidizing gas.

51. A device for incinerating sold waste, as recited in claim 23, and further comprising means for providing first oxidizing gas to the rotating section to at least partially burn the components of the hazardous waste.

52. The method of incineration of claim 24, wherein said first oxidizing gas is provided inside the first section through oxidizing gas injection means.

53. The method of incineration of claim 24, wherein the first oxidizing gas is air.

54. The method of claim 24, wherein the first oxidizing gas is at least 21% oxygen.

55. The method of claim 26, wherein the oxygen content of the first oxidizing gas is less than the oxygen content of the second oxidizing gas.

56. A device for recycling of useful component from a solid waste, comprising:
 (a) a first rotating section for transporting of solid waste within the device, the first rotating section having a forward opening at a first end thereof for introducing waste into the device and an exit opening at a second end thereof;
 (b) first burning means for heating and at least partially volatizing components of the solid waste in the first rotating section to produce first flue gases and hot residue;

(c) a second rotating section for further transporting the residue within the device, the second rotating section having a forward opening at a first end thereof and an exit opening at a second end thereof, wherein the exit opening of the first rotating section is in flow communication with the forward opening of the second rotating section;

(d) means for providing oxidizing gas to at least one of the rotating sections to at least partially burn the volatized components of the waste;

(e) second burning means for increasing the temperature of waste residue in the second rotating section to further convert said residue into useful material and flue gas;

(f) means for collecting the useful material from the device; and (g) means for removing flue gas from the device.

57. A device for incinerating solid waste, comprising:

(a) a rotary section for transporting solid waste having a forward opening at a first end through which solid waste may be introduced and an exit opening at a second end; said rotary section rotatable at a controlled frequency around a central axis and sloping downwardly from the first end to the second end;

(b) a first non-rotating wall having an opening communicating with the first end of the rotary section;

(c) means for collecting residue communicating with the opening of the second non-rotating wall;

(d) means for exhausting flue gas from said rotary section;

(e) a second non-rotating wall having an opening communicating with the second end of the rotary section;

(f) multi-flame combustor means located inside the rotary section for discharging multiple flames into the rotary section for raising the temperature of the solid residue traveling along the rotary section; and (g) means for controllably providing fuel and oxidizing gas to the multi-flame combustor means.

58. A device, as recited in claim 57, wherein said means for controllably providing fuel and oxidizing gas to the multi-flame combustor means provides oxidizing gas which is at least 21% oxygen.

59. A device, as recited in claim 57, and further comprising means for water-cooling the multi-flame combustor means.

60. A device, as recited in claim 57, wherein said multi-flame combustor means is provided within the first non-rotating wall.

61. A device, as recited in claim 57, wherein the multi-flame combustor means is provided within the second non-rotating wall.

62. A device, as recited in claim 57, wherein the multi-flame combustor means comprise a plurality of flame discharging nozzles.

63. A device, as recited in claim 57, and further comprising at least one additional rotary section adjacent and sequential to the rotary section.

64. The device of claim 56, wherein means for removing flue gases from the device are located at the exit opening of the first rotating section.

65. The device of claim 56, wherein means for removing flue gases from the device are located at the exit opening of the second rotating section.

66. The device of claim 56, wherein means for removing flue gases from the devices are located at the forward opening of the first rotating section.

* * * * *